United States Patent
Zhou et al.

(10) Patent No.: US 11,742,665 B2
(45) Date of Patent: Aug. 29, 2023

(54) POWER MARGIN TRACKING CONTROL METHOD AND SYSTEM FOR MULTI-TERMINAL HIGH-VOLTAGE DIRECT CURRENT CONVERTER STATION

(71) Applicant: NORTH CHINA ELECTRIC POWER UNIVERSITY, Beijing (CN)

(72) Inventors: Ming Zhou, Beijing (CN); Shiyi Zhang, Beijing (CN); Gengyin Li, Beijing (CN)

(73) Assignee: NORTH CHINA ELECTRIC POWER UNIVERSITY, Beijing (CN)

( * ) Notice: Subject to any disclaimer, the term of this patent is extended or adjusted under 35 U.S.C. 154(b) by 230 days.

(21) Appl. No.: 17/388,152

(22) Filed: Jul. 29, 2021

(65) Prior Publication Data
US 2022/0029422 A1    Jan. 27, 2022

Related U.S. Application Data

(63) Continuation of application No. PCT/CN2020/095544, filed on Jun. 11, 2020.

(30) Foreign Application Priority Data

May 25, 2020    (CN) .......................... 202010447115.0

(51) Int. Cl.
   *H02J 3/36*      (2006.01)
   *H02J 3/24*      (2006.01)

(52) U.S. Cl.
   CPC ................. *H02J 3/36* (2013.01); *H02J 3/24* (2013.01); *H02J 2003/365* (2013.01); *H02J 2203/10* (2020.01)

(58) Field of Classification Search
CPC .......... H02J 3/36; H02J 3/24; H02J 2003/365; H02J 2203/10
See application file for complete search history.

(56) References Cited

U.S. PATENT DOCUMENTS 10,770,988 B2 *   9/2020   Chen ..................... H02M 7/493
2016/0336746 A1 *   11/2016   Cheng ...................... H02J 1/12
(Continued)

FOREIGN PATENT DOCUMENTS

CN     106253320 A    12/2016
CN     109120005 A    1/2019
(Continued)

OTHER PUBLICATIONS

Chen, et al., "Research on Improved Droop Control Method of Multi-Terminal MMC-HVDC System Suitable for Power Fluctuation" North East Electric Power University, Jilin 132012, Jilin Province China, Power System Technology, vol. 42, No. 11, p. 3708, Nov. 2018.

*Primary Examiner* — Harry R Behm
(74) *Attorney, Agent, or Firm* — AKC Patents, LLC; Aliki K. Collins

(57) ABSTRACT

A power margin tracking control method and system for a multi-terminal high-voltage direct current converter station are provided. A power adjustment factor is introduced on the basis of a droop coefficient, to realize a self-adaptive regulation of a converter station operation mode to a real-time fluctuation of a wind and solar power. In this way, the system operation stability and the power fluctuation allocation capability in a grid-connected system are improved. Furthermore, a DC voltage deviation in the multi-terminal high-voltage direct current grid is reduced.

8 Claims, 3 Drawing Sheets

(56) References Cited

U.S. PATENT DOCUMENTS

2020/0106258 A1    4/2020    Mehraeen et al.
2020/0313565 A1\*  10/2020  Mohamed Sayed Ahmed ............ H02M 7/125

FOREIGN PATENT DOCUMENTS

| CN | 110086193 A |   | 8/2019 |         |
|----|-------------|---|--------|---------|
| CN | 110137997 A | * | 8/2019 | ........ H02J 3/06 |
| CN | 110198045 A | * | 9/2019 | ........ H02J 3/24 |

\* cited by examiner

POWER MARGIN TRACKING CONTROL METHOD AND SYSTEM FOR MULTI-TERMINAL HIGH-VOLTAGE DIRECT CURRENT CONVERTER STATION

CROSS REFERENCE TO RELATED CO-PENDING APPLICATIONS

This application claims priority to Chinese Patent Application No. 202010447115.0 filed with the China National Intellectual Property Administration (CNIPA) on May 25, 2020 and entitled "POWER MARGIN TRACKING CONTROL METHOD AND SYSTEM FOR MULTI-TERMINAL HIGH-VOLTAGE DIRECT CURRENT CONVERTER STATION", which is incorporated herein by reference in its entirety. This application also claims priority to PCT Patent Application No. PCT/CN2020/095544 filed on Jun. 11, 2020 and entitled "POWER MARGIN TRACKING CONTROL METHOD AND SYSTEM FOR MULTI-TERMINAL HIGH-VOLTAGE DIRECT CURRENT CONVERTER STATION", which is incorporated herein by reference in its entirety.

FIELD OF THE INVENTION

The present disclosure relates to the technical field of operation control on a direct current (DC) converter station, and in particular, to a power margin tracking (PMT) control method and system for a multi-terminal high-voltage direct current (MTDC) converter station.

BACKGROUND OF THE INVENTION

As power systems present operational characteristics of high-proportion renewables grid-connection, strong uncertainties and fluctuations of power systems bring challenges to reliable operations of grid-connected systems. In this regard, the Multi-Terminal High-Voltage Direct Current (MTDC) Transmission technology is considered to be an efficient solution to collect and transmit a large scale renewables and make a flexible response, for its flexible and rapid power regulation capability and technical advantages of suppressing fluctuations of renewables output.

Traditionally, under a system-level control strategy of a master-slave control, a constant DC voltage or a constant active power is adopted in DC grid to control the operation of DC converter stations. However, with a premise of an ideal operation scenario and an MTDC network topology, operation modes of the converter stations in a future scheduling period may be arranged by this control strategy, and a real-time communication among the converter stations is required in the MTDC system. As a result, it is difficult for this control strategy to deal with a real-time random fluctuation and a sudden failure of a wind and solar power. For this reason, a flexible and controllable strategy for power-voltage droop control is proposed. In this control method, a fixed droop coefficient (FDC) shown by a dotted line in FIG. 2 is still used, which seriously limits tracking and adjusting capabilities for a big continuous fluctuation of the grid-connected power, and is difficult to flexibly respond to system power flow changes, leading to frequent fluctuations in DC voltage of the converter station, even a threaten to a stable operation of the DC grid.

Therefore, there is an urgent need in the art to provide an operation control method for an MTDC converter station, which is suitable for improving a flexible operation capability of the high-proportion renewables grid-connection, to resolve existing problems such as a poor power fluctuation allocation capability in the grid-connected system, a high DC voltage deviation in the MTDC grid, and a poor system operation stability.

SUMMARY OF THE INVENTION

An objective of the present disclosure is to provide a PMT control method and system for an MTDC converter station, so as to realize a self-adaptive regulation of the converter station operation mode to the real-time fluctuation of the wind and solar power, and further, to resolve the existing problems such as the poor power fluctuation allocation capability in the grid-connected system, the high DC voltage deviation in the MTDC grid, and the poor system operation stability.

To achieve the foregoing objective, the present disclosure provides the following solutions:

A PMT control method for an MTDC converter station includes:

obtaining a DC operation power upper limit and a DC voltage upper limit of the MTDC converter station;

selecting an operation point in the MTDC converter station as a reference operation point, and obtaining a DC operation power and a DC voltage of the reference operation point;

obtaining a DC operation power of a real-time operation point in the MTDC converter station;

determining a droop coefficient of the MTDC converter station based on the DC operation power upper limit, the DC voltage upper limit, and the DC operation power and the DC voltage of the reference operation point;

determining a power adjustment factor of the MTDC converter station based on the DC operation power upper limit, the DC operation power of the reference operation point, and the DC operation power of the real-time operation point;

determining a DC operation voltage of the real-time operation point based on the droop coefficient, the power adjustment factor, the DC operation power and the DC voltage of the reference operation point, and the DC operation power of the real-time operation point; and performing the PMT control on the MTDC converter station based on the DC operation voltage.

Optionally, the determining the droop coefficient of the MTDC converter station based on the DC operation power upper limit, the DC voltage upper limit, and the DC operation power and the DC voltage of the reference operation point may include:

determining the droop coefficient of the MTDC converter station based on a formula of $$k = \frac{U_d^{max} - U_{d0}}{P_d^{max} - P_{d0}},$$

where k is the droop coefficient, $U_d^{max}$ is the DC voltage upper limit, $U_{d0}$ is the DC voltage of the reference operation point, $P_d^{max}$ is the DC operation power upper limit, and $P_{d0}$ is the DC operation power of the reference operation point.

Optionally, the determining the power adjustment factor of the MTDC converter station based on the DC operation power upper limit, the DC operation power of the reference operation point, and the DC operation power of the real-time operation point may include:

determining the power adjustment factor of the MTDC converter station based on a formula of $$\xi = \frac{|P_d - P_{d0}|}{P_d^{max} - P_{d0}},$$

where $\xi$ is the power adjustment factor, $P_d$ is the DC operation power of the real-time operation point, $P_d^{max}$ is the DC operation power upper limit, and $P_{d0}$ is the DC operation power of the reference operation point.

Optionally, the determining the DC operation voltage of the real-time operation point based on the droop coefficient, the power adjustment factor, the DC operation power and the DC voltage of the reference operation point, and the DC operation power of the real-time operation point may include:

determining a control model of the MTDC converter station based on a formula of $U_d = -\xi \cdot k(P_d - P_{d0}) + U_{d0}$, where $U_d$ is the DC operation voltage, $\xi$ is the power adjustment factor, $P_d$ is the DC operation power of the real-time operation point, $P_{d0}$ is the DC operation power of the reference operation point, and $U_{d0}$ is the DC voltage of the reference operation point.

A PMT control system for an MTDC converter station includes:

a first obtaining module, configured to obtain a DC operation power upper limit and a DC voltage upper limit of the MTDC converter station;

a reference operation point selecting module, configured to select an operation point in the MTDC converter station as a reference operation point, and obtain a DC operation power and a DC voltage of the reference operation point;

a second obtaining module, configured to obtain a DC operation power of a real-time operation point in the MTDC converter station;

a droop coefficient determining module, configured to determine a droop coefficient of the MTDC converter station based on the DC operation power upper limit, the DC voltage upper limit, and the DC operation power and the DC voltage of the reference operation point;

a power adjustment factor determining module, configured to determine a power adjustment factor of the MTDC converter station based on the DC operation power upper limit, the DC operation power of the reference operation point, and the DC operation power of the real-time operation point;

a DC operation voltage determining module, configured to determine a DC operation voltage of the real-time operation point based on the droop coefficient, the power adjustment factor, the DC operation power and the DC voltage of the reference operation point, and the DC operation power of the real-time operation point; and a PMT control module, configured to perform the PMT control on the MTDC converter station based on the DC operation voltage.

Optionally, the droop coefficient determining module may include:

a droop coefficient determining unit, configured to determine the droop coefficient of the MTDC converter station based on a formula of $$k = \frac{U_d^{max} - U_{d0}}{P_d^{max} - P_{d0}},$$

where k is the droop coefficient, $U_d^{max}$ is the DC voltage upper limit, $U_{d0}$ is the DC voltage of the reference operation point, $P_d^{max}$ is the DC operation power upper limit, and $P_{d0}$ is the DC operation power of the reference operation point.

Optionally, the power adjustment factor determining module may include:

a power adjustment factor determining unit, configured to determine the power adjustment factor of the MTDC converter station based on a formula of $$\xi = \frac{|P_d - P_{d0}|}{P_d^{max} - P_{d0}},$$

where $\xi$ is the power adjustment factor, $P_d$ is the DC operation power of the real-time operation point, $P_d^{max}$ is the DC operation power upper limit, and $P_{d0}$ is the DC operation power of the reference operation point.

Optionally, the DC operation voltage determining module may include:

a DC operation voltage determining unit, configured to determine a control model of the MTDC converter station based on a formula of $U_d = -\xi \cdot k(P_d - P_{d0}) + U_{d0}$, where $U_d$ is the DC operation voltage, $\xi$ is the power adjustment factor, $P_d$ is the DC operation power of the real-time operation point, $P_{d0}$ is the DC operation power of the reference operation point, and $U_{d0}$ is the DC voltage of the reference operation point.

Based on specific embodiments provided in the present disclosure, the present disclosure has the following technical effects:

In the PMT control method and system for the MTDC converter station provided in the present disclosure, the power adjustment factor is introduced on the basis of the droop coefficient, to realize the self-adaptive regulation of the converter station operation mode to the real-time fluctuation of the wind and solar power. In this way, the system operation stability and the power fluctuation allocation capability in the grid-connected system are improved. Furthermore, the DC voltage deviation in the MTDC grid is reduced.

BRIEF DESCRIPTION OF THE DRAWINGS

To describe the technical solutions in the embodiments of the present disclosure or in the existing technology more clearly, the accompanying drawings required for the embodiments are briefly described below. Apparently, the accompanying drawings in the following description show merely some embodiments of the present disclosure, and a person of ordinary skill in the art may still derive other accompanying drawings from these accompanying drawings without creative efforts.

DETAILED DESCRIPTION OF THE INVENTION

The technical solutions of the embodiments of the present disclosure are clearly and completely described below with reference to the accompanying drawings. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The objective of the present disclosure is to provide a PMT control method and system for an MTDC converter station, so as to realize a self-adaptive regulation of the converter station operation mode to a real-time fluctuation of a wind and solar power, and further, to resolve existing problems such as a poor power allocation fluctuation capability in the grid-connected system, a high DC voltage deviation in the MTDC grid, and a poor system operation stability.

To make the foregoing objective, features, and advantages of the present disclosure clearer and more comprehensible, the present disclosure will be further described in detail below with reference to the accompanying drawings and specific embodiments.

Figure 1:
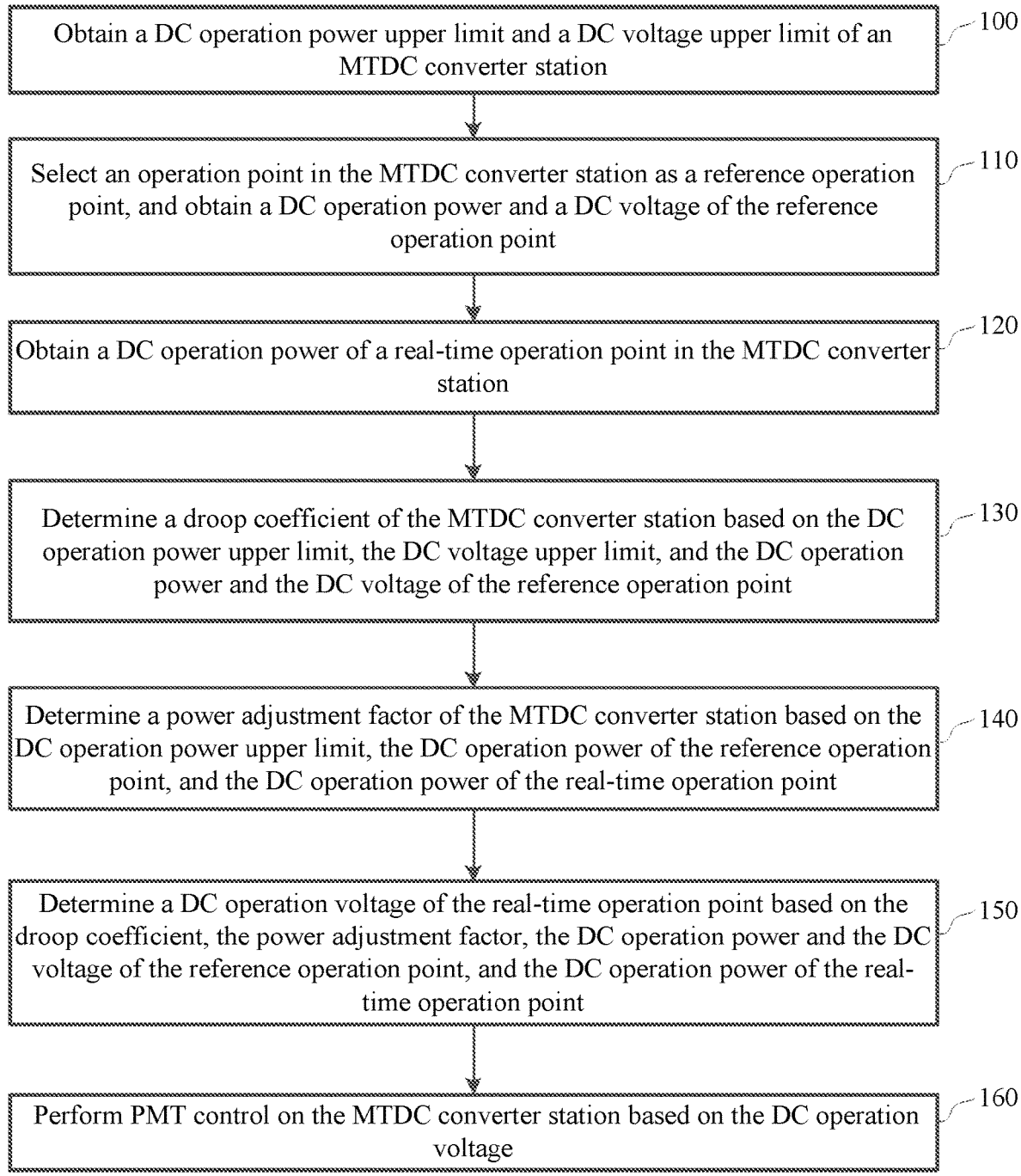
FIG. 1 is a flowchart of a PMT control method for an MTDC converter station according to the present disclosure.

FIG. 1 is the flowchart of the PMT control method for the MTDC converter station according to the present disclosure. As shown in FIG. 1, the PMT control method for the MTDC converter station includes steps 100-160:

Step 100: a DC operation power upper limit and a DC voltage upper limit of the MTDC converter station are obtained.

Step 110: an operation point in the MTDC converter station is selected as a reference operation point, and a DC operation power and a DC voltage of the reference operation point are obtained. In the present disclosure, the reference operation point is represented as $(P_{d0}, U_{d0})$.

Step 120: a DC operation power of a real-time operation point in the MTDC converter station are obtained. Wherein, the real-time operation point is represented as $(P_d, U_d)$.

Step 130: a droop coefficient of the MTDC converter station is determined based on the DC operation power upper limit, the DC voltage upper limit, and the DC operation power and the DC voltage of the reference operation point. The specific process of determining the droop coefficient may be as follows:

The existing droop control method specifies an apportion ratio of each converter station to a system unbalance amount when a power fluctuation occurs, by the DC converter station presetting the droop coefficient (that is, the slope of the dotted line in FIG. 2) on the base of the reference operation point, which may be set as a midpoint in an operation range. Then, the converter station automatically searches for a new stable operation point along this control characteristic line with this fixed slope.

Based on the above control method, a control formula of the droop control method in the existing technology is as follows:

$$U_d = -k(P_d - P_{d0}) + U_{d0} \qquad (1)$$

The formula for determining the droop coefficient of the MTDC converter station is as follows:

$$k = \frac{U_d^{max} - U_{d0}}{P_d^{max} - P_{d0}} \qquad (2)$$

Wherein, k is the droop coefficient, $U_d^{max}$ is the DC voltage upper limit, $U_{d0}$ is the DC voltage of the reference operation point, $P_d^{max}$ is the DC operation power upper limit, and $P_{d0}$ is the DC operation power of the reference operation point.

Then, the droop coefficient of the MTDC converter station may be determined based on the formula (2).

Step 140: a power adjustment factor of the MTDC converter station is determined based on the DC operation power upper limit, the DC operation power of the reference operation point, and the DC operation power of the real-time operation point. The power adjustment factor may be determined by being introduced on the basis of the droop coefficient with the following formula:

$$\xi = \frac{|P_d - P_{d0}|}{P_d^{max} - P_{d0}} \qquad (3)$$

Wherein, $\xi$ is the power adjustment factor, and $0 \leq \xi \leq 1$. A larger $\xi$ indicates that the real-time operation point is closer to the limit and the margin is smaller. $P_d$ is the DC operation power of the real-time operation point, $P_d^{max}$ is the DC operation power upper limit, and $P_{d0}$ is the DC operation power of the reference operation point.

The power adjustment factor of the MTDC converter station can be determined based on the above formula (3).

Step 150: a DC operation voltage of the real-time operation point is determined based on the droop coefficient, the power adjustment factor, the DC operation power and the DC voltage of the reference operation point, and the DC operation power of the real-time operation point.

The DC operation voltage of the real-time operation point is determined based on the following formula (4):

$$U_d = -\xi \cdot k(P_d - P_{d0}) + U_{d0} \qquad (4)$$

Wherein, $U_d$ is the DC operation voltage of the real-time operation point, $\xi$ is the power adjustment factor, $P_d$ is the DC operation power of the real-time operation point, $P_{d0}$ is the DC operation power of the reference operation point, and $U_{d0}$ is the DC voltage of the reference operation point.

Figure 2:
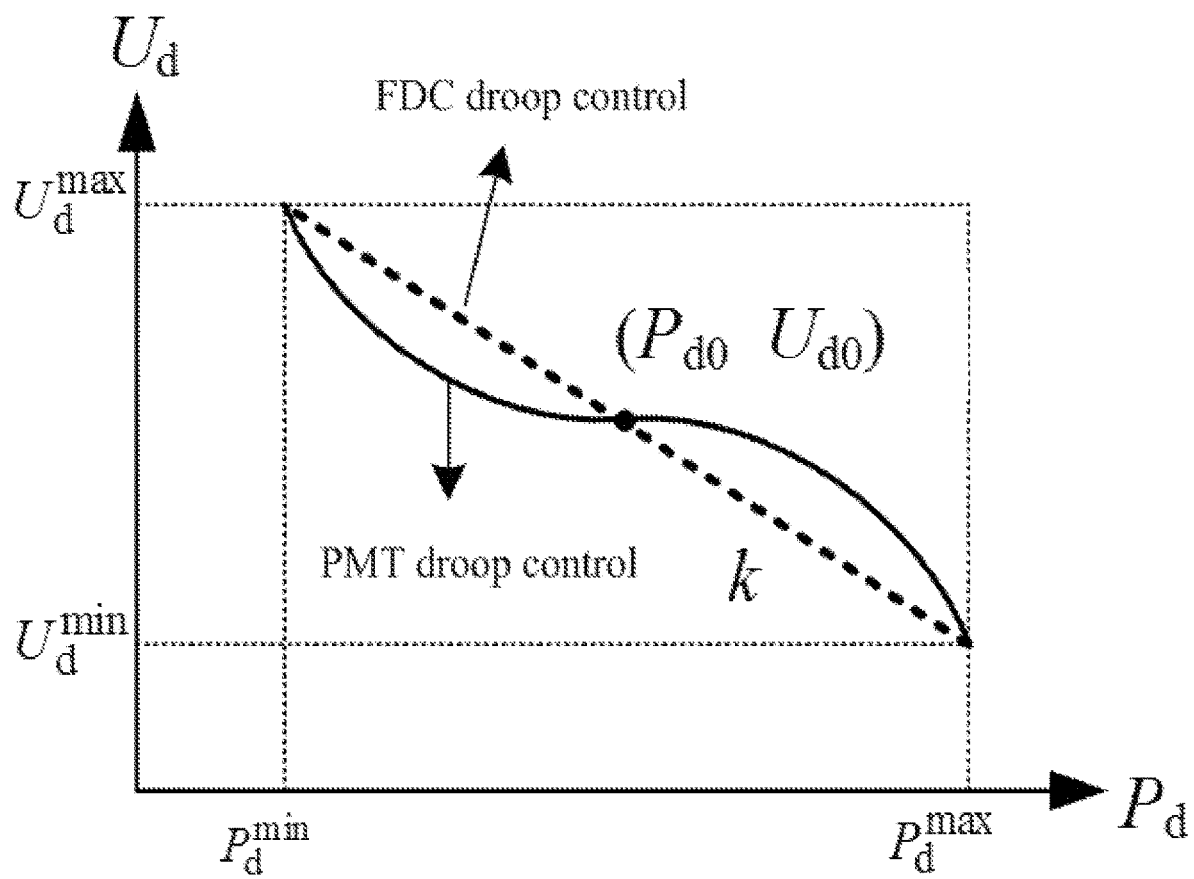
FIG. 2 is an operational characteristic curve chart of a PMT control method and a conventional FDC droop control strategy.

According to the above formula (4), a relationship curve between a power adjustment range $(P_d^{max}, P_d^{min})$ and a voltage adjustment range $(U_d^{max}, U_d^{min})$ is obtained, as shown by the solid line in FIG. 2. Wherein $P_d^{min}$ is a DC operation power lower limit, and $U_d^{min}$ is a DC voltage lower limit.

Step 160: the PMT control is performed on the MTDC converter station based on the DC operation voltage.

In the following, the advantages of the PMT control method provided in the present disclosure will be further described when compared with the existing FDC droop control method.

The slopes of the existing FDC droop control method and the PMT control method proposed in the present disclosure are respectively calculated by taking derivatives of the formula (1) in the existing FDC droop control method and the formula (4) of the PMT control method proposed in the present disclosure:

$$k_{FDC} = \frac{dU_d}{dP_d} = -k' \qquad (5)$$

$$k_{PMT} = \frac{dU_d}{dP_d} = -2k \cdot \frac{|P_d - P_{d0}|}{P_d^{max} - P_{d0}} \qquad (6)$$

Wherein, $k_{FDC}$ is the slope of the FDC droop control method, k' is the droop coefficient of the FDC droop control method, and $k_{PMT}$ is the slope of the PMT control method.

The following can be learned by comparing $k_{FDC}$ with $k_{PMT}$.

(1) When the converter station operates at the reference operation point ($P_d=P_{d0}$), $k_{PMT}=0$, and the converter station is actually under a state of a constant DC voltage control.

(2) When the operation state of the converter station changes, but the converter station still operates near the reference point, the DC operation power $P_d$ satisfies the following formula:

$$P_d \in \left( \frac{3P_{d0} - P_d^{max}}{2}, \frac{P_d^{max} + P_{d0}}{2} \right) \quad (7)$$

There is $k_{PMT} < k_{FDC}$. At this situation, the PMT control method tends to stabilize the DC voltage of the converter station.

(3) When the operation state of the converter station continues to deviate from the reference point and approach a limit capacity, the DC operation power $P_d$ satisfies the following formula:

$$P_d \in \left[ \left( P_d^{min}, \frac{3P_{d0} - P_d^{max}}{2} \right) U \left( \frac{P_d^{max} + P_{d0}}{2}, P_d^{max} \right) \right] \quad (8)$$

There is $k_{PMT} > k_{FDC}$, showing that the PMT control method tends to stabilize the power of the converter station. Moreover, the closer the real-time operation power is to the limit capacity, the greater the droop coefficient is, and the smaller the power apportion ratio is. That means to slow down a speed of the real-time operation point approaching the limit and to retain a power regulation capability.

A DC voltage change caused by a change of the operation point in the FDC droop control is denoted as $\Delta u_1$, and a DC voltage change in the PMT droop control is denoted as $\Delta u_2$. The two may be obtained as follows:

$$\Delta u_1 = -k(P_d - P_{d0}) \quad (9)$$

$$\Delta u_2 = -\xi \cdot k(P_d - P_{d0}) \quad (10)$$

Due to $0 \leq \xi \leq 1$, there is:

$$|\Delta u_2| - |\Delta u_1| = (\xi - 1) \cdot k(P_d - P_{d0}) \leq 0 \quad (11)$$

Based on above analysis, it can be seen that when the converter station operates at the reference operation point, i.e. $P_d = P_{d0}$, both control strategies have no DC voltage deviation, that is, $\Delta u_1 = \Delta u_2 = 0$.

When the converter station reaches the limit capacity, i.e., $\xi = 1$, there is $|\Delta u_1| = |\Delta u_2|$.

When the DC voltage deviation is generated as long as the converter station deviates from the reference operation point, there is $|\Delta u_2| < |\Delta u_1|$, that is, the proposed PMT control method can reduce the DC voltage deviation caused by the fluctuation of the wind and solar power.

Based on the above analysis, the proposed PMT control method in the present disclosure introduces the power adjustment factor on the basis of the droop coefficient, to track the power margin of the converter station in real time, so that each converter station may perform a self-adaptive regulation to the fluctuation of the wind and solar power. This control strategy has the merits in improving an allocation capability of the system power fluctuation, reducing the DC voltage deviation in the MTDC grid, and improving the system operation stability.

Figure 3:
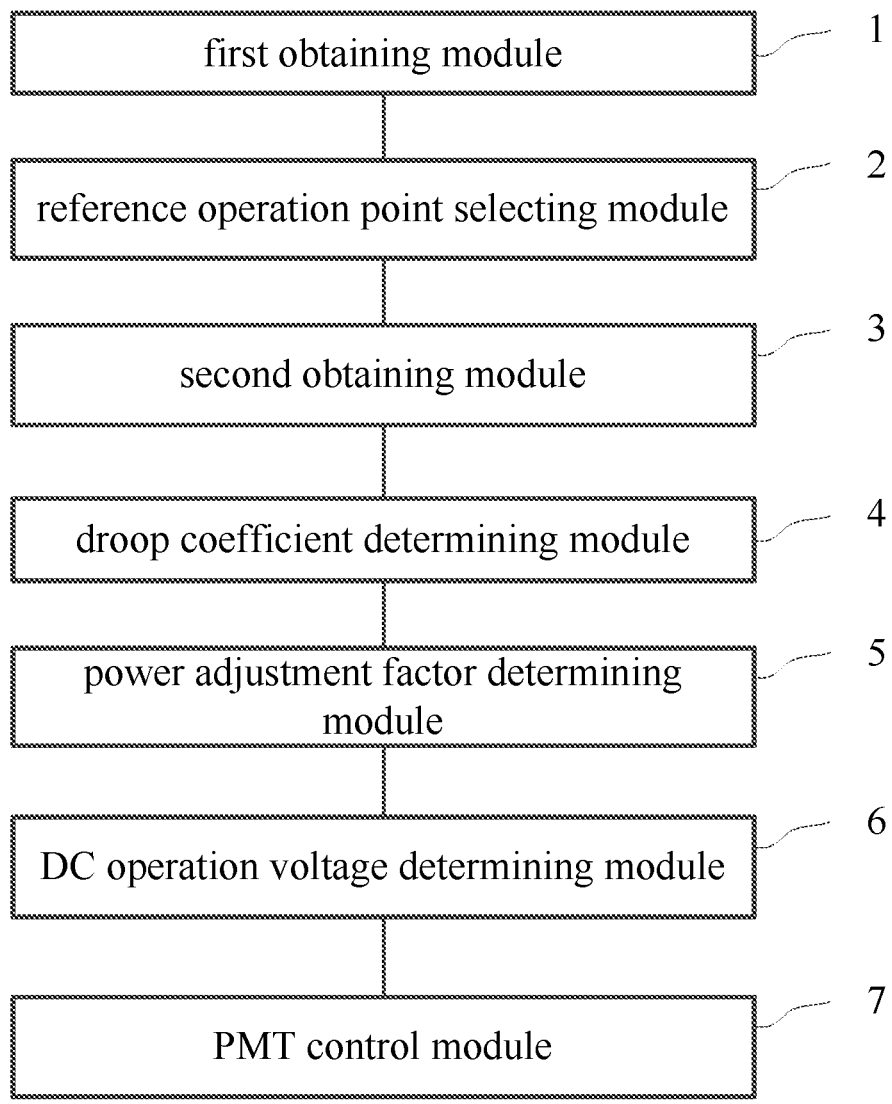
FIG. 3 is a schematic structural diagram of a PMT control system for an MTDC converter station according to the present disclosure.

In addition, in view of the PMT control method for the MTDC converter station provided above, the present disclosure correspondingly provides a PMT control system for an MTDC converter station. As shown in FIG. 3, the PMT control system includes: a first obtaining module 1, a reference operation point selecting module 2, a second obtaining module 3, a droop coefficient determining module 4, a power adjustment factor determining module 5, a DC operation voltage determining module 6, and a PMT control module 7.

Wherein, the first obtaining module 1 is configured to obtain a DC operation power upper limit and a DC voltage upper limit of the MTDC converter station.

The reference operation point selecting module 2 is configured to: select an operation point in the MTDC converter station as a reference operation point, and obtain a DC operation power and a DC voltage of the reference operation point.

The second obtaining module 3 is configured to obtain a DC operation power of a real-time operation point in the MTDC converter station.

The droop coefficient determining module 4 is configured to determine a droop coefficient of the MTDC converter station based on the DC operation power upper limit, the DC voltage upper limit, and the DC operation power and the DC voltage of the reference operation point.

The power adjustment factor determining module 5 is configured to determine a power adjustment factor of the MTDC converter station based on the DC operation power upper limit, the DC operation power of the reference operation point, and the DC operation power of the real-time operation point.

The DC operation voltage determining module 6 is configured to determine a DC operation voltage of the real-time operation point based on the droop coefficient, the power adjustment factor, the DC operation power and the DC voltage of the reference operation point, and the DC operation power of the real-time operation point.

The PMT control module 7 is configured to perform the PMT control on the MTDC converter station based on the DC operation voltage.

In another embodiment of the present disclosure, the droop coefficient determining module 4 may include a droop coefficient determining unit.

Wherein, the droop coefficient determining unit is configured to determine the droop coefficient of the MTDC converter station based on a formula of $$k = \frac{U_d^{max} - U_{d0}}{P_d^{max} - P_{d0}}.$$

Wherein k is the droop coefficient, $U_d^{max}$ is the DC voltage upper limit, $U_{d0}$ is the DC voltage of the reference operation point, $P_d^{max}$ is the DC operation power upper limit, and $P_{d0}$ is the DC operation power of the reference operation point.

In another embodiment of the present disclosure, the power adjustment factor determining module 5 may include a power adjustment factor determining unit.

The power adjustment factor determining unit is configured to determine the power adjustment factor of the MTDC converter station based on a formula of $$\xi = \frac{|P_d - P_{d0}|}{P_d^{max} - P_{d0}}.$$

Wherein $\xi$ is the power adjustment factor, $P_d$ is the DC operation power of the real-time operation point, $P_d^{max}$ is the DC operation power upper limit, and $P_{d0}$ is the DC operation power of the reference operation point.

In another embodiment of the present disclosure, the DC operation voltage determining module 6 may include a DC operation voltage determining unit.

The DC operation voltage determining unit is configured to determine a control model of the MTDC converter station based on a formula of $U_d = -\xi \cdot k(P_d - P_{d0}) + U_{d0}$. Wherein $U_d$ is the DC operation voltage, $\xi$ is the power adjustment factor, $P_d$ is the DC operation power of the real-time operation point, $P_{d0}$ is the DC operation power of the reference operation point, and $U_{d0}$ is the DC voltage of the reference operation point.

Each embodiment of the present specification is described in a progressive manner, each embodiment focuses on the difference from other embodiments, and the same and similar parts between the embodiments may refer to each other. For the system disclosed in the embodiments, since the system corresponds to the method disclosed in the embodiments, the system is simply described, and some description of the system related to the method can refer to the method description.

In this description, several specific embodiments are used for illustration of the principles and implementations of the present disclosure. The description of the foregoing embodiments is used to help understand the method of the present disclosure and the core ideas thereof. In addition, persons of ordinary skill in the art can make various modifications in terms of specific implementations and the scope of application in accordance with the ideas of the present disclosure. In conclusion, the content of this description shall not be construed as a limitation to the present disclosure.

Several embodiments of the present invention have been described. Nevertheless, it will be understood that various modifications may be made without departing from the spirit and scope of the invention. Accordingly, other embodiments are within the scope of the following claims.

What is claimed is:

1. A power margin tracking (PMT) control method for a multi-terminal high-voltage direct current (MTDC) converter station, comprising:
   obtaining a direct current (DC) operation power upper limit and a DC voltage upper limit of the MTDC converter station;
   selecting an operation point in the MTDC converter station as a reference operation point, and obtaining a DC operation power and a DC voltage of the reference operation point;
   obtaining a DC operation power of a real-time operation point in the MTDC converter station;
   determining a droop coefficient of the MTDC converter station based on the DC operation power upper limit, the DC voltage upper limit, and the DC operation power and the DC voltage of the reference operation point;
   determining a power adjustment factor of the MTDC converter station based on the DC operation power upper limit, the DC operation power of the reference operation point, and the DC operation power of the real-time operation point;
   determining a DC operation voltage of the real-time operation point based on the droop coefficient, the power adjustment factor, the DC operation power and the DC voltage of the reference operation point, and the DC operation power of the real-time operation point; and
   performing the PMT control on the MTDC converter station based on the DC operation voltage.

2. The PMT control method for the MTDC converter station according to claim 1, wherein the determining the droop coefficient of the MTDC converter station based on the DC operation power upper limit, the DC voltage upper limit, and the DC operation power and the DC voltage of the reference operation point comprises:
   determining the droop coefficient of the MTDC converter station based on a formula of $$k = \frac{U_d^{max} - U_{d0}}{P_d^{max} - P_{d0}},$$

wherein k is the droop coefficient, $U_d^{max}$ is the DC voltage upper limit, $U_{d0}$ is the DC voltage of the reference operation point, $P_d^{max}$ is the DC operation power upper limit, and $P_{d0}$ is the DC operation power of the reference operation point.

3. The PMT control method for the MTDC converter station according to claim 1, wherein the determining the power adjustment factor of the MTDC converter station based on the DC operation power upper limit, the DC operation power of the reference operation point, and the DC operation power of the real-time operation point comprises:
   determining the power adjustment factor of the MTDC converter station based on a formula of $$\xi = \frac{|P_d - P_{d0}|}{P_d^{max} - P_{d0}},$$

wherein $\xi$ is the power adjustment factor, $P_d$ is the DC operation power of the real-time operation point, $P_d^{max}$ is the DC operation power upper limit, and $P_{d0}$ is the DC operation power of the reference operation point.

4. The PMT control method for the MTDC converter station according to claim 1, wherein the determining the DC operation voltage of the real-time operation point based on the droop coefficient, the power adjustment factor, the DC operation power and the DC voltage of the reference operation point, and the DC operation power of the real-time operation point comprises:
   determining a control model of the MTDC converter station based on a formula of $U_d = -\xi \cdot k(P_d - P_{d0}) + U_{d0}$, wherein $U_d$ is the DC operation voltage, $\xi$ is the power adjustment factor, $P_d$ is the DC operation power of the real-time operation point, $P_{d0}$ is the DC operation power of the reference operation point, and $U_{d0}$ is the DC voltage of the reference operation point.

5. A power margin tracking (PMT) control system for a multi-terminal high-voltage direct current (MTDC) converter station, comprising:
- a first obtaining module, configured to obtain a direct current (DC) operation power upper limit and a DC voltage upper limit of the MTDC converter station;
- a reference operation point selecting module, configured to select an operation point in the MTDC converter station as a reference operation point, and obtain a DC operation power and a DC voltage of the reference operation point;
- a second obtaining module, configured to obtain a DC operation power of a real-time operation point in the MTDC converter station;
- a droop coefficient determining module, configured to determine a droop coefficient of the MTDC converter station based on the DC operation power upper limit, the DC voltage upper limit, and the DC operation power and the DC voltage of the reference operation point;
- a power adjustment factor determining module, configured to determine a power adjustment factor of the MTDC converter station based on the DC operation power upper limit, the DC operation power of the reference operation point, and the DC operation power of the real-time operation point;
- a DC operation voltage determining module, configured to determine a DC operation voltage of the real-time operation point based on the droop coefficient, the power adjustment factor, the DC operation power and the DC voltage of the reference operation point, and the DC operation power of the real-time operation point; and
- a PMT control module, configured to perform the PMT control on the MTDC converter station based on the DC operation voltage.

6. The PMT control system for the MTDC converter station according to claim 5, wherein the droop coefficient determining module comprises:
- a droop coefficient determining unit, configured to determine the droop coefficient of the MTDC converter station based on a formula of $$k = \frac{U_d^{max} - U_{d0}}{P_d^{max} - P_{d0}},$$

wherein k is the droop coefficient, $U_d^{max}$ is the DC voltage upper limit, $U_{d0}$ is the DC voltage of the reference operation point, $P_d^{max}$ is the DC operation power upper limit, and $P_{d0}$ is the DC operation power of the reference operation point.

7. The PMT control system for the MTDC converter station according to claim 5, wherein the power adjustment factor determining module comprises:
- a power adjustment factor determining unit, configured to determine the power adjustment factor of the MTDC converter station based on a formula of $$\xi = \frac{|P_d - P_{d0}|}{P_d^{max} - P_{d0}},$$

wherein $\xi$ is the power adjustment factor, $P_d$ is the DC operation power of the real-time operation point, $P_d^{max}$ is the DC operation power upper limit, and $P_{d0}$ is the DC operation power of the reference operation point.

8. The PMT control system for the MTDC converter station according to claim 5, wherein the DC operation voltage determining module comprises:
- a DC operation voltage determining unit, configured to determine a control model of the MTDC converter station based on a formula of $U_d = -\xi \cdot k(P_d - P_{d0}) + U_{d0}$, wherein $U_d$ is the DC operation voltage, $\xi$ is the power adjustment factor, $P_d$ is the DC operation power of the real-time operation point, $P_{d0}$ is the DC operation power of the reference operation point, and $U_{d0}$ is the DC voltage of the reference operation point.

* * * * *